Nov. 30, 1926.
H. A. HOKE
1,609,022
LUBRICATOR PIPING CONNECTION FOR LOCOMOTIVES
Filed Nov. 10, 1924
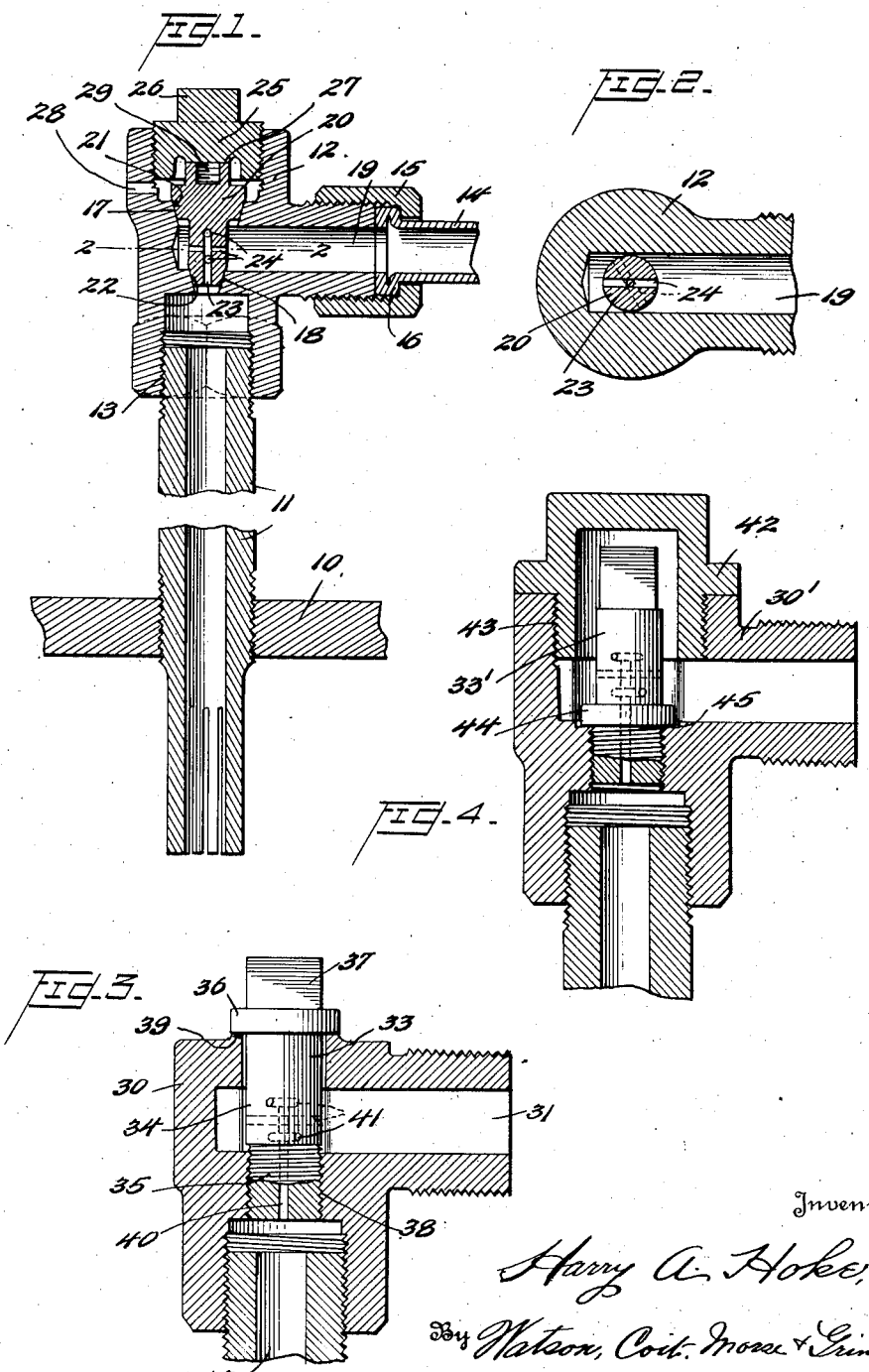

Patented Nov. 30, 1926.

1,609,022

UNITED STATES PATENT OFFICE.

HARRY A. HOKE, OF ALTOONA, PENNSYLVANIA.

LUBRICATOR PIPING CONNECTION FOR LOCOMOTIVES.

Application filed November 10, 1924. Serial No. 749,054.

The present invention relates to lubricator pipe connections for steam engines and more particularly to oil choke pipe connections for steam locomotives.

It is a general object of this invention to provide an improved form of pipe connection and oil choke for use in lubricating steam engines.

More particularly, it is an object of this invention to provide an oil choke which can be readily cleaned and gauged without the necessity of removing the oil pipe connection therefrom.

Another object of this invention is to provide in an oil choke connection, means whereby the choke plug may be removed as an entirety from the pipe connection for cleaning, gauging or renewal without disassembling the piping.

In the accompanying drawings, there are disclosed, by way of example, three embodiments of the present invention, with the understanding that various changes may be made therein in proportion, size and arrangement of parts without departing from the spirit of the invention as expressed in the attached claims.

In said drawings:

Figure 1 is a longitudinal cross-section through a lubricator pipe connection according to this invention.

Figure 2 is a transverse section on line 2—2 of Figure 1.

Figure 3 is a longitudinal section through a modified form of lubricator connection showing the choke plug partly in elevation, and Figure 4 is a similar view of an additional modification.

In the lubrication of steam engines, and more particularly locomotive engines, it is customary to introduce lubricating oil into the steam pipe leading to the steam chest, in order that the oil may mix with the steam and thus lubricate the pistons, piston rods, valves, and valve gear, as is well known. Oil is supplied to the pipe under the pressure of steam from the boiler and is fed into the pipe in consequence of the difference in pressure existing between the direct boiler pressure and that on the steam chest side of the throttle valve. In order to regulate the quantity of oil delivered, the lubricator pipe, before its entry into the steam pipe, is provided with a choke plug having a hole of a predetermined size to allow the passage of the proper quantity of oil to lubricate the engine. It has been customary in the past to introduce the choke plug into a pipe fitting directly in the oil line, but since it is necessary to make periodic inspections of the choke plug to determine whether it is clean and to gauge the size of the bore, it has been found that the continual disconnecting of the pipe fittings, especially those of the copper or other soft metal oil pipe, result in wear, leading to leakage of oil and steam, and it is the principal object of the present invention to overcome this objection by providing means for removing the choke plug without disconnecting the oil pipe.

Referring to Figure 1, 10 indicates the wall of the steam pipe leading to the steam chest, and 11 the oil conducting pipe, sometimes known as the "tallow" pipe, having mounted on its upper end the T-shaped lubricator fitting 12 by means of the screw threaded connection 13. The flexible copper oil conducting pipe 14 enters from the side of the T and is connected thereto by means of the internally threaded collar 15, passing over the enlarged end 16 of the oil pipe 14, as is well known in the art.

The fitting 12 is provided with the tapered bore 17, 18 coaxial with the bore of the tallow pipe 11, which bore is intersected near its center by the bore 19 coextensive with the opening in the oil pipe 14. The choke plug 20 is provided with the tapered surfaces 21 and 22 of the same taper and adapted to form a tight fit with the tapered bore 17, 18. The choke plug 20 is provided with the axial bore 23 extending upward from the bottom about half the distance through the plug. This bore comprises the actual choke and is gauged to a predetermined size. Oil is admitted to the bore 23 through a plurality of radially extending holes 24 leading from the bore 23 to the surface of the plug 20 in the portion having its surface exposed to the bore 19, so that oil flowing from the pipe 14 may pass through the holes 24, having an aggregate area greater than the bore 23 into this bore, thence into the tallow pipe and into the steam pipe. By providing a plurality of holes 24 connecting the inlet 19 to the choke bore 23 and having the aggregate area of the holes 24 considerably greater than the bore 23, it will be seen that the clogging of one or more of the holes 24 will not reduce the efficiency of the apparatus, nor cause less oil to flow than required by the diameter of the choke. This is an important feature of the applicant's invention, for it insures correct operation and an adequate supply of oil under conditions which would cause failure were but a single choke bore provided. The choke plug 20 is retained in position against the pressure of the steam and oil by means of a plug or cap 25, screw threaded into an extension on the end of the fitting 12 and having a square or hexagonal head 26 for the application of a wrench. The lower end of this plug 25 is provided with a depression, the bottom of which is adapted to bear upon the upper reduced end 27 of the choke plug 20 and force it securely into the tapered bore in the fitting 12, thus forming a steam-tight fit between the parts 18, 22 and 17, 21 to prevent an excess amount of oil flowing into the tallow pipe and a leakage of steam from the fitting around the cap 25. To insure that a pressure is not built up between the choke plug 20 and the cap 25 in the space provided between them, the bore 28 may be provided to the atmosphere to relieve any such pressure due to leakage in order that removal of the cap 25 may not result in injury to workmen.

To insure easy removal of the choke plug for cleaning and inspection, it may be provided with a shallow threaded hole 29 in its upper reduced portion to allow the insertion of an implement for withdrawing it.

The lubricator piping connection shown in Figure 3 is connected in the oil line in a similar manner to that described in connection with Figure 1 and comprises the L-shaped fitting 30 provided with the intersecting bores 31 and 32, the bore 32 passing completely through the length of the connection, whereas the bore 31 stops short of the left hand end thereof. The choke plug 33 comprises a straight cylindrical portion 34 threaded as at 35 at its lower end and provided with the flange 36, above which it is square or hexagonal in cross-section as at 37 for the application of a wrench. This choke plug is adapted to have its threaded portion 35 engaged in the threaded portion 38 of the bore 32 to form a steam-tight fit therewith and at the same time to draw the flange 36 down into a steam-tight connection with the face 39 on the upper end of the fitting 30. The choke plug is provided with the choke bore 40, as in the previous case, connected to the surface of the plug exposed within the bore 31 by means of the radial holes 41. This construction is much simpler than that shown in Figure 1 and requires but one operation to completely remove the choke plug for inspection, cleaning and gauging.

The device disclosed in Figure 4 is substantially similar to that shown in Figure 3, but the upper end of the fitting 30' has an enlarged bore extended to receive the cap 42 so that the plug 33' is entirely enclosed therein. The cap 42 has screw threaded engagement with the fitting 30' as at 43 to render it steam-tight. With this construction, it is necessary to provide a flange 44 on the choke plug in order that it may not be screwed too far into the fitting 30'. A counter-bore 45 accommodates this flange. The construction is otherwise identical with that disclosed in Figure 3 and need not be further described. This construction can be kept steam-tight more readily however.

From the above descriptions of the various modifications of this invention, it will be evident that access can readily be had to the choke plug for cleaning, gauging and inspection without disconnecting the soft metal pipe line, such as 14, which is readily worn so that it soon develops leaks. It is usual to make these inspections about once a month, and it will be apparent that a great amount of time can be saved by the use of the simple construction illustrated. It is also obvious that spare, cleaned and properly gauged plugs may be carried by the workmen to replace all of those removed, which can then be later cleaned and gauged for use during the next inspection, thus effecting a greater saving of time.

Having thus described my invention what I claim as new and desire to secure by Letters Patent is:

1. A lubricating device for steam engines including in combination, a hollow T-shaped fitting, an outlet opening in one arm of said T, a cap in the other arm of said T, an inlet opening in the base of said T, a tapered passage connecting the two arms of said T, a bore connecting said inlet opening to said passage, and a tapered plug in said passage having a choke bore therein connecting said inlet bore to said outlet, said plug being retained in stationary position by said cap.

2. A lubricating device for steam engines including in combination a T-shaped fitting, an outlet opening in one arm of said T, cap receiving means in the other arm of said T, an inlet opening in the base of said T, a tapered passage connecting the two arms of said T, a bore connecting said inlet opening to the tapered passage, a tapered plug adapted to have a tight fit with said tapered passage above and below said bore, a choke bore in said plug communicating with said outlet passage, a plurality of holes leading from the surface of said plug to said choke bore, said holes having an aggregate area greater than the choke bore and communicating with the inlet passage, and a cap in said T arm having means to press said plug tightly into said tapered passage.

In testimony whereof I hereunto affix my signature.

HARRY A. HOKE.